United States Patent [19]

Asai et al.

[11] 4,276,138

[45] Jun. 30, 1981

[54] METHOD FOR REDUCING ELECTROSTATIC CHARGING ON SHAPED ARTICLES OF POLYVINYL CHLORIDE RESINS

[75] Inventors: Michihiko Asai, Fujisawa; Yoshio Suda, Hachioji; Kiyoshi Imada, Omiya; Susumu Ueno; Hirokazu Nomura, both of Ibaragi, all of Japan

[73] Assignees: Agency of Industrial Science & Technology; Shin-Etsu Chemical Co., Ltd., both of Japan

[21] Appl. No.: 51,148

[22] Filed: Jun. 22, 1979

[30] Foreign Application Priority Data

Jun. 27, 1978 [JP] Japan .................................. 53-77807
Oct. 31, 1978 [JP] Japan ................................ 53-133956

[51] Int. Cl.$^3$ .......................... C08J 5/18; C08J 5/00; C08K 5/04; C08K 5/42
[52] U.S. Cl. .......................... 204/165; 260/DIG. 19; 260/DIG. 20; 528/486; 528/487; 528/490; 528/492; 528/494
[58] Field of Search ................ 204/165; 528/490, 486, 528/487, 492, 494

[56] References Cited

U.S. PATENT DOCUMENTS

| | | | |
|---|---|---|---|
| 3,687,832 | 8/1972 | Fydelor | 204/165 |
| 3,755,225 | 8/1973 | Pierce, Jr. | 528/494 X |
| 3,894,077 | 7/1975 | Horikawa | 260/DIG. 20 |
| 3,895,000 | 7/1975 | Mathieu | 260/DIG. 21 |
| 3,950,318 | 4/1976 | Park | 528/487 |
| 3,992,495 | 11/1976 | Sano | 264/22 |
| 4,056,456 | 11/1977 | Sano | 204/165 |
| 4,072,769 | 2/1978 | Lidel | 427/38 |
| 4,113,679 | 9/1978 | Andrascheck | 525/4 |
| 4,133,947 | 1/1979 | Kalka | 528/502 |
| 4,140,607 | 2/1979 | Kreiselmeier | 204/168 |

*Primary Examiner*—C. A. Henderson
*Attorney, Agent, or Firm*—McGlew and Tuttle

[57] ABSTRACT

A method for reducing static electricity on the surface of a shaped article made of polyvinyl chloride resins, which method comprises the steps of (a) blending a surface active agent with the polyvinyl chloride resin prior to fabrication of the resin into a shaped article, (b) fabricating the resin admixed with the surface active agent into a shaped article, and (c) subjecting the shaped article to a treatment with low temperature plasma of a gas.

3 Claims, No Drawings

METHOD FOR REDUCING ELECTROSTATIC CHARGING ON SHAPED ARTICLES OF POLYVINYL CHLORIDE RESINS

BACKGROUND OF THE INVENTION

The present invention relates to a method for reducing electrostatic charging on the surface of shaped articles made of polyvinyl chloride resins and, in particular, to a new and useful method by which a very durable effect is obtained in reducing electrostatic charging on the surface of shaped articles made of polyvinyl chloride resins.

As is well known, polyvinyl chloride resins belong to one of the most important classes of thermoplastic synthetic resins, and shaped articles of the resin are widely employed in various applications.

One of the difficulties encountered in the use of shaped articles made of polyvinyl chloride based synthetic resins, is the outstanding tendency of these articles to be charged with static electricity which, in turn, results in a rapid loss of beauty in the appearance of the articles due to the adhesion or attraction of dust as well as in an unpleasant or sometimes dangerous effect to the human body, such as an electric shock by the electrostatic charges accumulated on the surface of the articles.

Various attempts have hitherto been made to reduce the accumulation of static electricity on the surfaces of shaped articles of polyvinyl chloride resins, including the application of an antistatic agent on to the surfaces and incorporation of an antistatic agent into the resin composition prior to fabrication of the resin composition, into the shaped articles. The surface application method of coating can give an instantaneous effect but is disadvantageous in the poor durability of its effectiveness as well as in the sticky touch of the surfaces which eventually leads to blocking of the shaped articles. The incorporation method is, on the other hand, better than the surface application method, in the durability of its antistatic effect, but the effectiveness is usually insufficient due to the limited amount of the antistatic agent incorporated in the shaped articles. When the amount of the antistatic agent incorporated is increased, a view toward obtaining a sufficient antistatic effect, the surfaces of these shaped articles also become sticky due to the bleeding of the antistatic agent leading to blocking of the shaped articles in addition to the problems of decreased heat resistance, poor workability and coloring and accelerated staining of the surfaces.

On the other hand, an attempt has been made to reduce the static electricity on the surfaces of shaped articles of polyvinyl chloride resins, by the treatment of the surface with low temperature plasma of a gas whereby the affinity of the surface with water can be enhanced. The antistatic effect obtained by this method is, however, not always satisfactory, especially, in its durability.

SUMMARY OF THE INVENTION

It is therefore an object of the present invention to provide a novel method for reducing the static electricity on the surfaces of a shaped article made of a polyvinyl chloride resin or, in particular, to provide an efficient method capable of producing a very durable antistatic effect on the surfaces of a shaped article of a polyvinyl chloride resin.

Thus, the method of the present invention, established as a result of the extensive investigations undertaken by the inventors of the above object, comprises the steps of (a) blending a surface active agent with the polyvinyl chloride resin prior to fabrication of the resin into a shaped article, (b) fabricating the polyvinyl chloride resin admixed with the surface active agent into a shaped article, and (c) subjecting the shaped article to a treatment with low temperature plasma of a gas.

The method of the present invention is so effective that the antistatic effect obtained by the above method is very durable lasts for a long period of time even with an amount of the surface active agent in the shaped article as small as 0.003 to 3 parts by weight per 100 parts by weight of the polyvinyl chloride resin.

DETAILED DESCRIPTION OF THE PREFERRED EMBODIMENTS

The polyvinyl chloride resins used in the above mentioned step (a), are not particularly limited to certain specific types of polyvinyl chloride resins including homopolymers of vinyl chloride of various average degrees of polymerization, but include copolymers of vinyl chloride with one or more copolymerizable comonomers as the main component, for example, 50% by weight or more, of the copolymer being vinyl chloride. The comonomers copolymerizable with vinyl chloride are well known in the art and are exemplified by vinyl esters such as vinyl acetate, vinyl ethers such as vinylethyl ether, acrylic and methacrylic acids and esters thereof, maleic and fumaric acids and esters thereof, maleic anhydride, aromatic vinyl compounds such as styrene, vinylidene halides such as vinylidene chloride, acrylonitrile, methacrylonitrile, olefins such as ethylene and propylene, and the like.

In step (a) of the inventive method, a surface active agent is blended with the polyvinyl chloride resin. The type of surface active agent used, is not limited but may include cationic, anionic, nonionic and amphoteric surface active agents, among which the most preferred are cationic surface active agents with higher effectiveness than the surface active agents of the other types.

The cationic surface active agents are classified into primary amine salts, secondary amine salts, tertiary amine salts, quaternary amine salts, pyridinium salts and the like and the anionic surface active agents are exemplified by sulfonated oils, metal soaps, sulfonated ester oils, sulfonated amide oils, sulfuric acid esters of olefins, sulfuric acid esters of aliphatic alcohols, ester salts of alkylsulfuric acids, aliphatic acid ethylsulfonates, alkylsulfonates, alkylnaphthalene sulfonates, alkylbenzene sulfonates, reaction products of naphthalenesulfonic acid and formalin, sulfonates of succinic acid esters, salts of phosphoric acid esters and the like.

The nonionic surface active agents include aliphatic carboxylic acid esters of polyvalent alcohols, addition products of ethylene oxides with aliphatic alcohols, addition products of ethylene oxide with aliphatic carboxylic acids, addition products of ethylene oxide with aliphatic amines or aliphatic amides, addition products of ethylene oxide with alkyl phenols, addition products of ethylene oxide with alkyl naphthols, addition products of ethylene oxide with partial carboxylic acid esters of polyvalent alcohols, polyethyleneglycols and the like and the amphoteric surface active agents include those of carboxylic acid type, e.g. betaine derivatives, sulfuric acid ester salts, e.g. sulfuric acid esters of hydroxyethylimidazoline, those of sulfonic acid type, e.g. taurine condensation type succinic acid esters and imidazolinesulfonic acids, and the like.

These surface active agents are blended with the polyvinyl chloride resin in an amount of from 0.003 to 3 parts by weight or, preferably, from 0.03 to 1 parts by weight per 100 parts by weight of the resin. When the amount is smaller than the above given range, the antistatic effect exhibited by the plasma treatment in the subsequent step (c) is insufficient while larger amounts of the surface active agent than above may have adverse effects on the properties of the shaped articles in addition to the increased staining of the surface of the articles.

The polyvinyl chloride resin composition prepared in step (a) above, in the inventive method may contain, in addition to the surface active agent, various kinds of additives conventionally admixed in polyvinyl chloride resin compositions to be fabricated into shaped articles with no particular disadvantages on the desired antistatic effect in the shaped articles. Those optional additives include plasticizers, stabilizers, fillers, anti-oxidants, ultraviolet light absorbers, antistatic agents other than surface active agents, antifogging agents, pigments, dyestuffs, crosslinking aids and the like. Further, several types of rubbery elastomers may be incorporated into the resin composition to improve the mechanical properties of the shaped articles if the amount thereof is not excessively large, say, less than 50 parts by weight per 100 parts by weight of the polyvinyl chloride resin.

It is convenient that the above named additives are blended with the resin simultaneously with the surface active agent but it is optional to blend these additives with the resin either prior to or after the blending of the surface active agent. Blending of the surface active agent as well as the other optional additives with the polyvinyl chloride resin is carried out in a conventional blending machine such as a roller mill and the like, preferably, at an elevated temperature.

The polyvinyl chloride resin composition thus obtained is then fabricated into a shaped article in step (b) of the inventive method. The techniques of fabrication are not limited and any conventional methods can be applied according to the shape of the desired article and the moldability of the resin composition including extrusion molding, injection molding, calendering, inflation, vacuum forming, blow molding, compression molding and the like. The shapes of the articles are also not limited although articles with complicated shapes, for example, with concavity may require specific elaboration in order to ensure uniform effect of treatment with low temperature plasma in the subsequent step (c) of the inventive method.

The shaped article obtained in the above step (b) of the inventive method is then subjected to a treatment with low temperature plasma as used. Low temperature plasma here, is well known in the art as a gaseous atmosphere full of electrically charged species where the temperature of the gaseous atmosphere is not excessively high in comparison with the ambient temperature irrespective of the energy of the charged species per se. Low temperature plasma is produced mainly by glow discharge in a gaseous atmosphere of a pressure in the range from 0.001 to 10 Torr where the frequency of the electric power supply is not limited and ranges from direct current to the microwave region. In particular, a frequency of the so-called high frequency region is recommended due to the availability of generator apparatuses and the possibility of obtaining stable plasma discharge. For example, a frequency of 13.56 MHz or 27.12 MHz is recommended since these frequencies are relatively free from statutory regulations for radio waves.

The shapes and arrangement of the electrodes are not limited insofar as a stable plasma discharge can be ensured within the space in which the surface of the shaped article is treated, i.e. exposed to the plasma atmosphere. Thus, a pair of inside electrodes, a pair of exterior electrodes and a coiled electrode may be used according to particular types of the apparatuses for plasma generation. The electrodes may be connected to the high frequency generator either by capacitive coupling or inductive coupling.

The intensity or power density of the low temperature plasma and the time required for the plasma treatment are interrelated parameters but extreme difficulties are encountered in explicitly defining the power density of low temperature plasma due to the very complicated nature of the plasma atmosphere which is in the present status of the art beyond understanding. Therefore, it is the best approach that the time for the plasma treatment be determined by a careful preparatory experiment in which several parameters, including the supplied electric power, are selected according to the specific purpose. With a power density obtained in most of the currently available apparatuses for plasma generation, a time from a few seconds to several tens of minutes is usually sufficient for obtaining the objective antistatic effect of the invention. In any case, it is a least requirement that the surface of the shapes articles never undergoes thermal degradation by the heat evolved in the discharge.

The other parameters to be taken into consideration in the plasma treatment are the kinds of gaseous constituents and the pressure of the gaseous atmosphere. The pressure of the gaseous atmosphere within the apparatus for plasma generation should be maintained in a range from 0.001 to 10 Torr or, preferably, from 0.01 to 1.0 Torr in order to ensure stability of the plasma discharge.

The gases filling the atmosphere under the above specified pressure is either inorganic or organic as exemplified by helium, neon, argon, nitrogen, nitrous oxide, nitrogen dioxide, oxygen, air, carbon monoxide, carbon dioxide, hydrogen, halogens, e.g. chlorine, and halogen compounds, e.g. hydrogen chloride, as well as olefins, e.g. ethylene and propylene, halogenated hydrocarbons, e.g. fluorocarbons, aromatic hydrocarbons, e.g. benzene, heterocyclic organic compounds, e.g. pyridine, organosilanes and the like. Among the above named gases, the inorganic gases are preferred to the organic ones due to the absence of coloration on the surface of the plasmatreated articles and formation of a powdery polymerized matter. In particular, helium, argon, carbon monoxide, carbon dioxide and hydrogen, especially, carbon monoxide, are preferred because of their higher efficiency which is due to an unknown mechanism. These gases are used either singly or as a mixture of two or more and, when a mixed gas is used, it is recommended that one of the components is carbon monoxide.

In accordance with the method of the present invention, an expectedly remarkable antistatic effect is obtained in the shaped articles of polyvinyl chloride resins with so small amounts of the surface active agent owing, presumably, to the synergistic effect produced by the treatment with low temperature plasma. In addition, the antistatic effect obtained by the inventive method is very advantageous in its durability and, along with the antistatic effect, the shaped articles obtained by the method have been found to have excellent anti-fogging property, resistance against staining, printability, workability and beauty in appearance.

Following are examples to illustrate the present invention in further detail, in which the amounts designated parts are all expressed by parts by weight.

EXAMPLE 1 (Experiments No. 1 and No. 2)

A resin composition was prepared by intimately blending 100 parts of a homopolymeric polyvinyl chloride resin having an average degree of polymerization of about 1,300 (TK-1300, a trade name by Shin-Etsu Chemical Co., Japan), 2 parts of calcium stearate, 2 parts of zinc stearate and 0.2 part of a cationic surface active agent stearamidopropyldimethyl-$\beta$-hydroxyethylammonium nitrate (Catanac SN, a trade name by American Cyanamide Co.) on a roller mill at 180° C. for 10 minutes and the resin composition was fabricated by press molding at 185° C. into a sheet of 1 mm thickness.

A 10 cm by 10 cm piece of the thus prepared sheet was placed on the lower electrode of 20 cm diameter facing the upper electrode with a distance of 3 cm in an apparatus for plasma generation and low temperature plasma was generated by a high frequency power supply of 50 watts at a frequency of 13.56 MHz for 10 minutes while the pressure in the apparatus was maintained at 0.2 Torr by passing argon gas with simultaneous evacuation by means of a vacuum pump.

The resin sheet thus treated with low temperature plasma on a surface as well as the sheet without the plasma treatment were subjected to the tests of the distance of cigarette ash attraction, electric surface resistivity, voltage by frictional charging and contact angle of water to give the results set out in Table 1 below (Experiment No. 1). The distance of cigarette ash attraction was determined by measuring the largest distance between cigarette ash and the sample sheet rubbed ten times with a cotton cloth at which the cigarette ash was attracted by the charged sample sheet at 25° C. in an atmosphere of 60% relative humidity. The voltage by frictional charging was determined by use of a rotary static tester made by Kowa Shokai Co., Japan, with a cotton cloth under the conditions of 200 g load, 750 r.p.m. and 30 seconds. Table 1 also gives the data obtained with the same sheet before the plasma treatment (Experiment No. 2).

EXAMPLE 2 (Experiments No. 3 to No. 6)

A resin composition was prepared by intimately blending 100 parts of the same polyvinyl chloride resin as used in Example 1, 1.5 parts of carmium stearate, 0.5 part of barium stearate and 0.1 part of a cationic surface active agent (New Elegan A, a trade name by Nippon Oil & Fats Co., Ltd., Japan for a cationic surface active agent which is an aliphatic quaternary ammonium salt dissolved in isopropyl alcohol in a concentration of 20% by weight) on a roller mill at 180° C. for 10 minutes and the resin composition was fabricated by press molding at 185° C. into a sheet of 1 mm thickness.

The thus prepared resin sheet was subjected to treatment with low temperature plasma in the same manner as in Example 1 except that the pressure of the argon atmosphere and the high frequency power supplied to the electrodes were 0.35 Torr and 75 watts, respectively, and the properties of the thus plasma-treated sheet were measured in the same manner as in Example 1 to give the results set out in Table 1 (Experiment No. 3). Table 1 also summarizes the data obtained with the same sheet before the plasma treatment (Experiment No. 4) as well as with the sheets prepared with a resin composition of the same formulation as above excepting with the omission of the cationic surface active agent before and after the plasma treatment (Experiments No. 5 and No. 6).

EXAMPLE 3 (Experiments No. 7 and No. 8)

A resin composition was prepared by intimately blending 100 parts of a 88:12 by weight copolymeric resin of vinyl chloride and vinyl acetate (SC-400, a trade name by Shin-Etsu Chemical Co., Japan), 1.5 parts of cadmium stearate, 0.5 part of barium stearate and 0.3 part of a cationic surface active agent (Denon 310, a trade name by Marubishi Yuka Co., Japan for a cationic surface active agent which is an aliphatic quaternary ammonium salt dissolved in a solvent in a concentration of 60% by weight) on a roller mill at 180° C. for 10 minutes and the resin composition was fabricated by press molding at 185° C. into a sheet of 1 mm thickness.

The thus prepared sheet was subjected to the treatment with low temperature plasma in the same manner as in Example 1 except that the atmosphere was air instead of argon and the pressure was 0.3 Torr and this plasma-treated sheet was subjected to the same tests as in Example 1 to give the results set out in Table 1 (Experiment No. 7). The same sheet before the plasma treatment was tested in the same manner and the results are also shown in the same table (Experiment No. 8).

EXAMPLE 4 (Experiments No. 9 and No. 10)

A resin composition was prepared by intimately blending 100 parts of a homopolymeric polyvinyl chloride resin having an average degree of polymerization of about 1,000 (TK-1000, a trade name by Shin-Etsu Chemical Co., Japan), 2 parts of calcium stearate, 2 parts of zinc stearate and 0.3 part of an anionic surface active agent sodium dodecylbenzene sulfonate (Neopelex F-60, a trade name by Kao Atlas Co., Japan) in a roller mill at 180° C. for 10 minutes and the resin composition was fabricated by press molding at 185° C. into a sheet of 0.5 mm thickness.

The thus prepared sheet was subjected to the treatment with low temperature plasma in the same manner as in Example 1 except that the pressure of the argon atmosphere was 0.3 Torr and this plasma-treated sheet was subjected to the same tests as in Example 1 to give the results set out in Table 1 (Experiment No. 9). The table also gives the data obtained with the same sheet before the plasma treatment (Experiment No. 10).

Example 5 (Experiments No. 11 to No. 14)

A resin composition was prepared by intimately blending 100 parts of the same polyvinyl chloride resin as used in Example 4, 1.5 parts of cadmium stearate, 0.5 part of barium stearate and 0.2 part of an anionic surface active agent, a normal paraffin sulfonate (TB-160, a trade name by Matsumoto Yushi Co., Japan) on a roller mill at 180° C. for 10 minutes and the resin composition was fabricated by press molding at 185° C. into a sheet of 0.5 mm thickness.

The thus prepared sheet was subjected to the treatment with low temperature plasma in the same manner as in Example 1 except that the plasma gas was a 90:10 by volume mixed gas of argon and carbon monoxide instead of pure argon and that the high frequency power supplied to the electrodes and the time of the plasma treatment were 100 watts and 5 minutes, respectively and this plasma-treated sheet was subjected to the same tests as in Example 1 to give the results set out in Table 1 (Experiment No. 11). The table also gives the data obtained with the same sheet before the plasma treatment (Experiment No. 12) as well as with the sheets prepared with a resin composition of the same formulation excepting the omission of the anionic surface active agent before and after the plasma treatment (Experiments No. 13 and No. 14).

EXAMPLE 6 (Experiments No. 15 and No. 16)

A resin composition was prepared by intimately blending 100 parts of the same polyvinyl chloride resin as used in Example 4, 2 parts of calcium stearate, 2 parts of zinc stearate and 0.5 part of a nonionic surface active agent which is a block copolymer of oxyethylene and oxypropylene units (Emulgen PP-250, a trade name by Kao Atlas Co., Japan) on a roller mill at 180° C. for 10 minutes and the resin composition was fabricated by press molding at 185° C. into a sheet of 0.5 mm thickness.

The thus prepared sheet was subjected to the treatment with low temperature plasma in the same manner as in Example 1 and this plasma-treated sheet was subjected to the same tests as in Example 1 to give the results set out in Table 1 (Experiment No. 15). The table also gives the data obtained with the same sheet before the plasma treatment (Experiment No. 16).

EXAMPLE 7 (Experiments No. 17 and No. 18)

A resin composition was prepared by intimately blending 100 parts of the same polyvinyl chloride resin as used in Example 4, 1.5 parts of cadmium stearate, 0.5 part of barium stearate and 0.3 part of a nonionic surface active agent (Denon 1886, a trade name by Marubishi Yuka Kogyo Co., Japan for an anionic surface active agent which is a straight-chained paraffin sulfonate) on a roller mill at 180° C. for 10 minutes and the resin composition was fabricated by press molding at 185° C. into a sheet of 0.5 mm thickness.

The thus prepared sheet was subjected to the treatment with low temperature plasma in the same manner as in Example 1 except that the plasma gas was a 80:20 by volume mixed gas of argon and carbon monoxide and that the pressure of the gas, the high frequency power supplied to the electrodes and the time of the plasma treatment were 0.1 Torr, 100 watts and 5 minutes, respectively, and this plasma-treated sheet was subjected to the same tests as in Example 1 to give the results set out in Table 1 (Experiment No. 17). The table also gives the data obtained with the same sheet before the plasma treatment (Experiment 18).

EXAMPLE 8 (Experiments No. 19 and No. 20)

A resin composition was prepared by intimately blending 100 parts of the same polyvinyl chloride resin as used in Example 4, 2 parts of calcium stearate, 2 parts of zinc stearate and 0.3 part of an amphoteric surface active agent (Chemistat 4005, a trade name by Sanyo Chemical Industries, Ltd., Japan) on a roller mill at 180° C. for 10 minutes and the resin composition was fabricated by press molding at 185° C. into a sheet of 0.5 mm thickness.

The thus prepared sheet was subjected to the treatment with low temperature plasma in the same manner as in Example 1 except that the pressure of the argon atmosphere was 0.3 Torr and this plasma-treated sheet was subjected to the same tests as in Example 1 to give the results set out in Table 1 (Experiment No. 19). The table also gives the data obtained with the same sheet before the plasma treatment (Experiment No. 20).

EXAMPLE 9 (Experiments No. 21 and No. 22)

A resin composition was prepared by intimately blending 100 parts of the same polyvinyl chloride resin as used in Example 4, 1.5 parts of cadmium stearate, 0.5 part of barium stearate and 0.2 part of an amphoteric surface active agent (Reostat 923, a trade name by The Lion Fat & Oil Co., Ltd., Japan) on a roller mill at 180° for 10 minutes and the resin composition was fabricated by press molding at 185° C. into a sheet of 0.5 mm thickness.

TABLE 1

| Exp. No. | Distance of cigarette ash attraction, cm | Surface resistivity, ohm | Voltage by frictional charging, volt | Contact angle of water |
| --- | --- | --- | --- | --- |
| 1 | 0 | $3.3 \times 10^{11}$ | 350 | 43° |
| 2 | 3 | $7.8 \times 10^{13}$ | 2800 | 71° |
| 3 | 0 | $6.0 \times 10^{10}$ | 100 | 33° |
| 4 | 2 | $7 \times 10^{12}$ | 2500 | 65° |
| 5 | 2 | $3 \times 10^{11}$ | 720 | 36° |
| 6 | 5 | $1.8 \times 10^{15}$ | 3200 | 90° |
| 7 | 0 | $2.3 \times 10^{10}$ | 230 | 46° |
| 8 | 1 | $1.8 \times 10^{12}$ | 2100 | 58° |
| 9 | 0 | $2.5 \times 10^{11}$ | 230 | 21° |
| 10 | 4 | $8.3 \times 10^{13}$ | 3200 | 65° |
| 11 | 0 | $5 \times 10^{10}$ | 210 | 32° |
| 12 | 2 | $8 \times 10^{12}$ | 1800 | 66° |
| 13 | 3 | $4 \times 10^{11}$ | 930 | 39° |
| 14 | 5 | $1.8 \times 10^{15}$ | 3200 | 90° |
| 15 | 0 | $4.6 \times 10^{11}$ | 530 | 28° |
| 16 | 3 | $2.1 \times 10^{14}$ | 3500 | 73° |
| 17 | 0 | $8 \times 10^{10}$ | 620 | 38° |
| 18 | 3 | $8 \times 10^{12}$ | 2800 | 63° |
| 19 | 0 | $2.1 \times 10^{11}$ | 250 | 23° |
| 20 | 4 | $2.8 \times 10^{13}$ | 2500 | 62° |
| 21 | 0 | $8 \times 10^{10}$ | 310 | 30° |
| 22 | 2.5 | $1.1 \times 10^{12}$ | 2200 | 65° |

The thus prepared sheet was subjected to the treatment with low temperature plasma in the same manner as in Example 5 and this plasma-treated sheet was subjected to the same tests as in Example 1 to give the results set out in Table 1 (Experiment No. 21). The table also gives the data obtained with the same sheet before the plasma treatment (Experiment No. 22).

EXAMPLE 10

Three kinds of resin compositions were prepared by intimately blending 100 parts of the same polyvinyl chloride resin as used in Example 4, 2 parts of calcium stearate, 2 parts of zinc stearate and 0.2 part of a cationic surface active agent (Ameet 105, a trade name by Kao Atlas Co., Japan), an anionic surface active agent (Neopelex F-60, a trade name by Kao Atlas Co.) or a nonionic surface active agent (Emulgen PP-250, a trade name by Kao Atlas Co.) on a roller mill at 180° C. for 10 minutes and the resin compositions were each fabricated by press molding at 185° C. into a sheet of 0.5 mm thickness.

The thus prepared sheets were each subjected to the treatment with low temperature plasma in the same manner as in Example 1 except that the pressure of the argon atmosphere was 0.4 Torr and these plasmatreated sheets were subjected to the tests of the distance of cigarette ash attraction, voltage by frictional charging and contact angle of water in the same manner as in Example 1 directly after the plasma treatment or after storage of 3 months or 6 months to give the results set out in Table 2 below.

TABLE 2

| Type of surface active agent | Period of storage | Distance of cigarette ash attraction, cm | Voltage by frictional charging, volt | Contact angle of water |
|---|---|---|---|---|
| Cationic | Initial | 0 | 180 | 35° |
|  | 3 months | 0 | 250 | 40° |
|  | 6 months | 0 | 350 | 49° |
| Anionic | Initial | 0 | 270 | 20° |
|  | 3 months | 0 | 380 | 25° |
|  | 6 months | 1 | 500 | 40° |
| Nonionic | Initial | 0 | 400 | 28° |
|  | 3 months | 1 | 600 | 37° |
|  | 6 months | 3 | 820 | 45° |

While specific embodiments of the invention have been shown and described in detail to illustrate the application of the principles of the invention, it will be understood that the invention may be embodied otherwise without departing from such principles.

What we claim is:

1. A method of reducing static electricity on the surface of articles made of polyvinyl chloride resin comprising:
   (A) blending a polyvinyl chloride resin with a surface active agent chosen from the group consisting of, primary amine salts, secondary amine salts, tertiary amine salts, quarternary amine salts, pyridinium salts, which are cationic surface active agents, sulfonated oils, metal soaps, sulfonated ester oils, sulfonated amide oils, sulfuric oil esters of olefins, sulfuric acid esters of aliphatic alcohols, ester salts of alkylsulfuric acids, aliphatic acid, ethylsulfonates, alkylsulfonates, alkylnaphthalene sulfonates, alkylbenzene sulfonates, reaction products of naphthalenesulfonic acid and formalin, sulfonates of succinic acid esters and salts of phosphoric acid esters, which are anionic surface active agents, and aliphatic carboxylic acid esters of polyvalent alcohols, addition products of ethylene oxides with aliphatic alcohols, addition products of ethylene oxide with aliphatic carboxylic acids, addition products of ethylene oxide with aliphatic amines and aliphatic amides, addition products of ethylene oxide with alkyl phenols, addition products of ethylene oxide with alkyl naphthols, addition products of ethylene oxide with partial carboxylic acid esters of polyvalent alcohols, polyethylene glycols and amphoteric surface active agents of the carboxylic acid type, betaine derivatives, sulfuric acid ester salts, sulfuric acid esters of hydroxyethylimidazoline, sulfonic acid type surface active agents, taurine condensation type succinic acid esters and imidazolinesulfonic acids which are nonionic surface active agents; with 0.03 to 1 parts by weight of the surface active agent being blended with each 100 parts by weight of the polyvinyl chloride;
   (B) fabricating the polyvinyl chloride resin and surface active agent blend into a shaped article; and
   (C) subjecting the shaped article to treatment with low-temperature plasma of a gas chosen from a group consisting of helium, neon, argon, nitrogen, nitrous oxide, nitrogen dioxide, oxygen, air, carbon monoxide, carbon dioxide, hydrogen, halogens, and halogen compounds, the pressure of the gas forming the low-temperature plasma being from 0.01 to 1.0 Torr and the plasma being generated by applying electrical power to the gas.

2. A method according to claim 1, further including blending with the polyvinyl chloride resin in addition to the surface active agent, an additional additive chosen from the group consisting of plasticizers, stabilizers, fillers, anti-oxidants, ultra-violet light absorbers, anti-static agents other than the surface active agents, anti-fogging agents, pigments, dyestuffs, cross-linking aids, and rubbery elastomers.

3. A method according to claim 1 wherein said polyvinylchloride resin is chosen from the group consisting of homopolymers of vinyl chloride, copolymers of vinyl chloride with one or more copolymerizable co-monomers, the comonomers chosen from a group comprising vinyl esters, vinyl ethers, acrylic acid, methacrylic acid, esters of acrylic and methacrylic acids, maleic and fumaric acids and esters thereof, maleic anhydride, aromatic vinyl compounds, vinylidene halides, acrylonitrile, methacrylonitrile, and olefins.

* * * * *